UNITED STATES PATENT OFFICE.

LAWRENCE E. BARRINGER, OF SCHENECTADY, NEW YORK, ASSIGNOR TO GENERAL ELECTRIC COMPANY, A CORPORATION OF NEW YORK.

INSULATING COMPOSITION AND THE METHOD OF MAKING THE SAME.

1,111,430.  Specification of Letters Patent.  Patented Sept. 22, 1914.

No Drawing.  Application filed May 7, 1914.  Serial No. 836,949.

*To all whom it may concern:*

Be it known that I, LAWRENCE E. BARRINGER, a citizen of the United States, residing at Schenectady, county of Schenectady, State of New York, have invented certain new and useful Improvements in Insulating Compositions and the Method of Making the Same, of which the following is a specification.

The present invention relates to molded compositions, and particularly to compositions suitable for electrical insulations.

In my prior Patent No. 1,085,102, of January 27, 1914, I have described and claimed a dense, hard, insulating molded composition containing both sulfurized oil and saponified oil. In accordance with my present invention the mechanical strength and insulating property of this class of molded materials is still further improved by associating with the ingredients a fossil gum, such, for example, as copal or kauri. As fully set forth in the above mentioned patent the insulating composition comprises as one of its ingredients a basic material such as zinc oxid, calcium hydrate, or the like which will saponify with oil to form a strong, porous mass which constitutes the hard frame-work for the material. The pores of this stony material are filled with the sulfurized oil which renders the material impervious to moisture. There may also be added to the ingredients various inert filling material such as powdered talc, slate, flint, mica, or other mineral powders, and also fibrous materials, such as asbestos. The fossil gum is preferably introduced in solution in the oil.

The following is a representative mixture illustrating my invention: 20 parts zinc oxid, 12 parts talc (ground), 32 parts slate (ground), 1 part sulfur, 20 parts asbestos, 8 parts drying or semi-drying oil, 8 parts fossil gum. To this mixture may be added about 15 parts of hard coal tar pitch, which combines to some degree with the sulfur and also acts to give a black color to the product. The solution of the gum in the oil should preferably be made before adding these ingredients to the mixture, the specific gravity of the solution being adjusted to the amounts of the solid ingredients and the subsequent treatment of the molded articles. For example, a fossil gum, for example, copal, kauri, or Pontianak, is dissolved in an equal amount of boiled linseed oil, China wood oil or a mixture of linseed, China wood and fish oil to make a homogenous solution or varnish. This varnish may be thinned with 62° naphtha to form a solution having a desired specific gravity.

The preparation of the mixture is carried out by grinding in a suitable apparatus, such as a ball-mill, the zinc oxid, talc, pitch and sulfur until a fine uniform powder is obtained. This powder is then uniformly mixed with asbestos and the varnish is then slowly added while agitation is continued. After the varnish has been thoroughly incorporated into the mass the compound is dried.

The drying is carried out by placing the mixture on shallow trays and allowing it to stand for a period of about 5 to 9 days. The composition is then molded into the desired shape in the usual well understood manner, for example, it may be compressed into steel molds in a hydraulic press. After molding the articles should be preferably dried in air for about 24 hours and then baked in an oven to which the temperature is gradually raised from about 50 to 60° C. the first day, to about 120° C. on the fifth day. The length of the final heat treatment, or curing process, may be varied in accordance with the size of the articles, small articles requiring a shorter time than large articles. This curing process completes the reaction between the basic material and the sulfur on the one hand and the oil on the other hand. The fossil gum remains largely uncombined.

Numerous tests have shown that molded insulations made as above described and containing a fossil gum, as well as the ingredients mentioned in my prior Patent No. 1,085,102, are improved about 20 to 25% in mechanical strength.

What I claim as new and desire to secure by Letters Patent of the United States, is:—

1. A composition of matter comprising a dense, hard insulating composition comprising sulfurized oil, saponified oil and a fossil gum.

2. A composition of matter comprising a dense, hard insulating composition comprising sulfurized oil, saponified oil and copal.

3. The process of forming a hard, dense insulating composition, which consists in exposing a mixture containing an oil, a fossil gum, sulfur and a saponifying material to the air for several days, molding the mixture and baking the same at a gradually rising temperature.

4. The process of forming a hard, dense insulating composition, which consists in exposing a mixture comprising linseed oil, copal, zinc oxid and sulfur to the air for about five to nine days, molding said mixture and finally baking for several days at a temperature rising about 50 to 60° C. to about 120° C.

In witness whereof, I have hereunto set my hand this 5th day of May, 1914.

LAWRENCE E. BARRINGER.

Witnesses:
BENJAMIN B. HULL,
MARGARET E. WOOLLEY.